July 26, 1932. J. A. LIEBERMAN ET AL Re. 18,541
RIDING BREECHES
Original Filed April 30. 1929
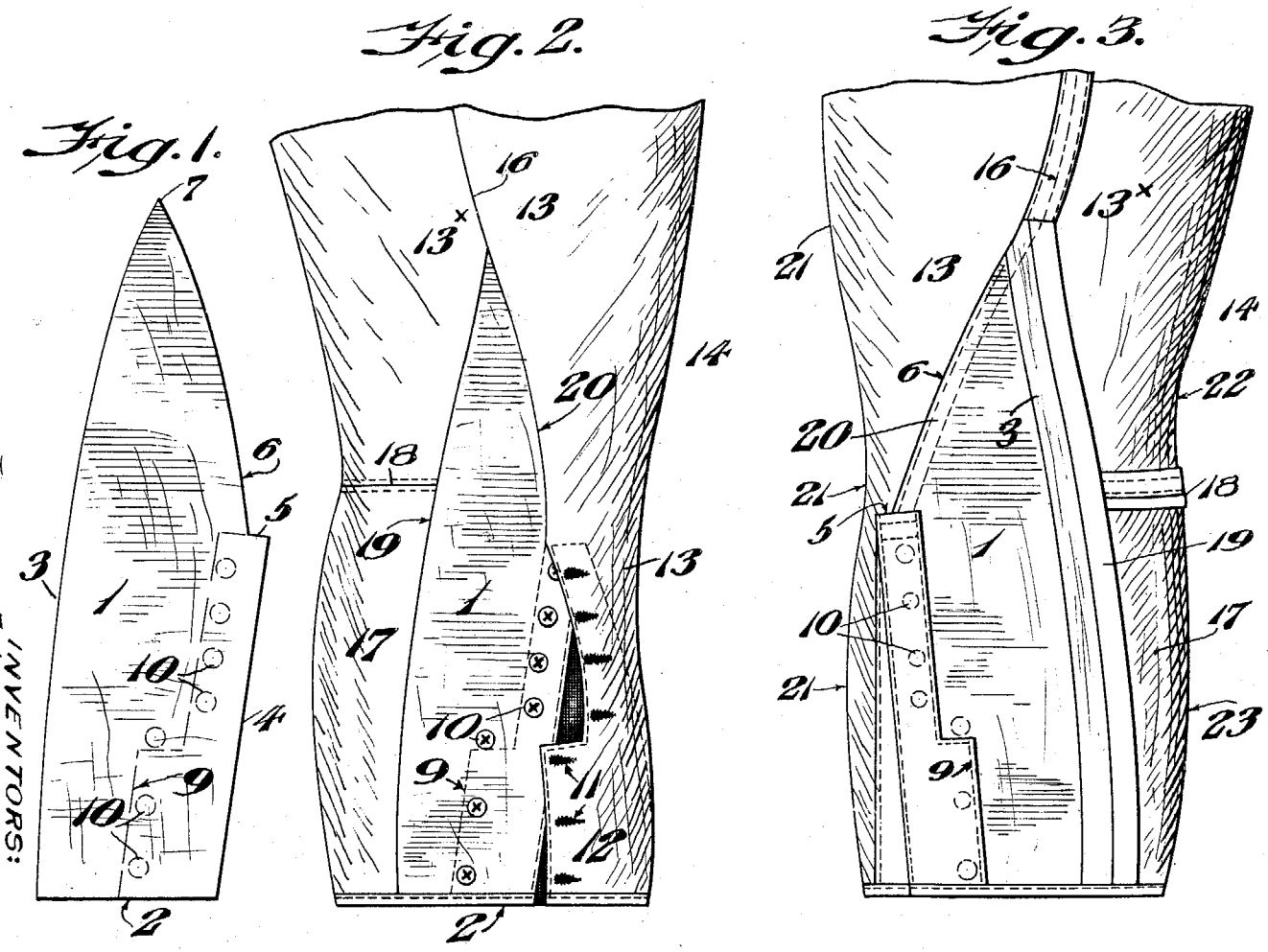
INVENTORS:
JOSEPH A. LIEBERMAN:
SAMUEL CAPLIN:
By
Leonard L. Kalish
Attorney Reissued July 26, 1932 Re. 18,541

UNITED STATES PATENT OFFICE

JOSEPH A. LIEBERMAN AND SAMUEL CAPLIN, OF PHILADELPHIA, PENNSYLVANIA

RIDING BREECHES

Original No. 1,746,951, dated February 11, 1930, Serial No. 359,236, filed April 30, 1929. Application for reissue filed November 7, 1931. Serial No. 573,706.

Our invention relates to a new and useful riding breeches, and it relates more particularly to a novel construction of the leg portion of ready-to-wear breeches, which lends itself to easy, accurate and inexpensive alteration to provide a good fit for the wearer.

Ready-to-wear riding breeches generally made and used heretofore have not been adapted for easy and inexpensive alteration, since, to enlarge or reduce the calf and knee portions of the breeches, it was necessary to take the numerous, variously curved, and intricately assembled parts forming the leg construction apart, and, after the necessary adjustments or alterations had been made, to resew such parts together. This often necessitated the taking apart of such parts as the button and buttonhole flies, as well as the leather or other reinforcing patches ordinarily provided for that portion of the leg which contacts with the saddle or the flanks of the horse.

In order to facilitate the alteration and fitting of ready-to-wear breeches it has been proposed to employ an auxiliary strip in the calf portion of the leg of the breeches, which could be ripped and enlarged or reduced. This however, failed to affect the knee portion of the leg of the breeches, which, when alteration was necessary still had to be taken completely apart and reassembled or made over.

It is therefore the object of our invention to provide an auxiliary strip extending from the bottom extremity of the breeches to a point above the knee portion, said strip extending rearwardly from the button fly to the main body portion of the leg of the breeches, so as not to interfere with reinforcing patches or other parts of the knee and calf construction.

A further object of our invention is to provide a strip of this character, one longitudinal edge of which embodies the lines or curves necessary to give form and shape to the leg of the breeches, while the opposite longitudinal edge thereof is relatively straight or gently curved, so that when it is desired to fit the calf and knee portions of the breeches, it is merely necessary to rip said strip from the main body portion of the leg, along said relatively straight or gently curved edge, thus reducing the fitting and alteration of the knee and calf portions of the leg of the breeches to the single and simple operation of ripping and resewing one straight or gently curved seam, in lieu of taking apart and resewing the variously curved and intricately assembled parts forming the knee and calf portions.

For the purpose of illustrating our invention, we have shown in the accompanying drawing one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the accompanying drawing:

Figure 1 represents a side elevation of the novel auxiliary strip embodying our invention shown detached.

Figure 2 represents a side elevation of the knee and calf portions of the leg of a pair of riding breeches provided with the strip embodying our invention.

Figure 3 represents a view of the construction seen in Figure 2, turned inside out.

Referring to the drawing, in which like reference characters indicate like parts, Figure 1 illustrates a strip comprising the body 1, having the straight bottom edge 2, the slightly curved continuous edge 3, and the straight edge 4, offset at 5 and merging into the curved edge 6. The body 1 tapers upwardly and terminates in the point or apex 7. 9 designates a button fly which is carried by the strip 1, and which carries the buttons 10 which are adapted to be engaged by the button holes 11 on the fly 12 which is carried by or integral with the continuous body portion 13 of the leg 14. The body portion 13 extends halfway around the leg and is joined to the body portion 13× by the seam 16. The body portion 13× is joined to the lower calf portion 17 by the seam 18. My novel strip 1 is joined along the continuous edge 3 to the body portion 13× and the calf portion 17 by the seam 19 and to the body portion 13 along the seam 20. The curved edge 21 of the body portion 13 and the curved edges 22 and 23 of the body portion 13× and calf portion 17 respectively, determine the shape or form of the leg 14. When it is desired to reduce or enlarge the leg 14 it is merely necessary to rip the continuous edge 3 and after the desired adjustment has been made, to resew the seam 19, whereby said leg is reduced or enlarged without in any way interfering with or affecting the form of the leg. The ripping and resewing of the continuous seam 19 consumes considerably less time and labour than is involved in the complete taking apart, adjustment, and reassembly of the various parts forming the leg 14 as will be readily apparent.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention, what we hereby claim as new and desire to secure by Letters Patent, is:

1. In a leg portion of riding breeches, an adjustment strip for the leg portion of riding breeches and the like, comprising an elongated body having a short, horizontal bottom edge, a continuous curved side edge extending upwardly from said bottom edge the entire length of said body, and an opposite, upper, curved side edge extending downwardly to about the midlength of said body and merging into an offset, straight side edge joined at its lower extremity to said bottom edge, said curved edges converging upwardly to form an upper tapered terminus for said body, said strip being sewed to the juxtaposed portions of said leg along said curved edges, whereby said leg may be widened or narrowed by the location of the seam joining said continuous curved edge to the juxtaposed portion of said leg.

2. In the leg portion of riding breeches, an adjustment strip for the leg portion of riding breeches and the like, comprising an elongated body having a short, horizontal bottom edge, a continuous, curved side edge extending upwardly from said bottom edge, the entire length of said body, and an opposite, upper curved side extending downwardly to about the midlength of said body and merging into an offset, straight side edge joined at its lower extremity to said bottom edge, said curved edges converging upwardly to form an upper tapered terminus for said body, said strip being sewed to the juxtaposed portions of said leg along said curved edges, whereby the width of said leg may be predetermined by the location of the seam joining said continuous curved edge to the juxtaposed portion of said leg, and fastening devices on the offset straight edge of said body.

3. In the leg portion of riding breeches and the like, an adjustment strip for the leg portion thereof, comprising an elongated body having a short, generally horizontal bottom edge, a side edge extending upwardly from said bottom edge the entire length of said body, and an opposite side edge having its upper portion converging towards the first mentioned side edge to form an upper tapered terminus for said body, said adjustment strip being sewed to the juxtaposed portions of said leg along one of said pair of opposed side edges and along the upper part of the other of said pair of opposed side edges, whereby said leg may be widened or narrowed by the relocation of the seam joining said first mentioned side edge to the juxtaposed portion of said leg, and complementary and coacting fastening means carried by the lower part of said last mentioned side edge and the corresponding portion of said leg for quick detachable union with each other.

4. Breeches and the like, having legs extending to a point below the knee, each of said legs being formed of juxtaposed front and rear leg portions joined to each other by generally upright seams, and including an adjustment strip; each of said adjustment strips being generally elongated and having a short, generally horizontal bottom edge, a side edge extending upwardly from said bottom edge, sewed to one of the juxtaposed portions of the leg throughout its length, and an opposite edge extending upwardly from said generally horizontal bottom edge, having its upper portion sewed to the other juxtaposed portion of the leg and carrying any suitable fastening means generally alongside its lower portion, and corresponding and complementary and co-acting fastening means carried by said other leg portion for effecting a quick attachable and detachable engagement between said lower edge portion of said adjustment strip and the corresponding leg portion; the upper portions of said upwardly extending side edges of said adjustment strip converging towards each other to form an upper tapered terminus; any desired widening and narrowing of the lower portions of the legs, in the region of the knee and below the knee, being effected by the relocation of the seam between the first mentioned upwardly extending side edge of the adjustment strip and the corresponding leg portion.

In testimony whereof we have hereunto set our hands this 2nd day of November, 1931.

JOSEPH LIEBERMAN.
SAMUEL CAPLIN.